United States Patent
Derakhshan et al.

(10) Patent No.: US 10,764,121 B2
(45) Date of Patent: Sep. 1, 2020

(54) NETWORK ENTITY OF A COMMUNICATION NETWORK

(71) Applicant: Alcatel Lucent, Boulogne Billancourt (FR)

(72) Inventors: Fariborz Derakhshan, Nuermberg (DE); Heidrun Grob-Lipski, Stuttgart (DE)

(73) Assignee: Alcatel Lucent, Nozay (FR)

( * ) Notice: Subject to any disclaimer, the term of this patent is extended or adjusted under 35 U.S.C. 154(b) by 577 days.

(21) Appl. No.: 14/410,338

(22) PCT Filed: May 22, 2013

(86) PCT No.: PCT/EP2013/060498
§ 371 (c)(1),
(2) Date: Dec. 22, 2014

(87) PCT Pub. No.: WO2014/000987
PCT Pub. Date: Jan. 3, 2014

(65) Prior Publication Data
US 2015/0341206 A1 Nov. 26, 2015

(30) Foreign Application Priority Data
Jun. 25, 2012 (EP) .................................. 12305738

(51) Int. Cl.
*G06F 15/177* (2006.01)
*H04L 12/24* (2006.01)
(Continued)

(52) U.S. Cl.
CPC ...... *H04L 41/0681* (2013.01); *H04L 41/0686* (2013.01); *H04L 41/0816* (2013.01);
(Continued)

(58) Field of Classification Search
CPC ............. H04L 41/0681; H04L 41/0816; H04L 41/0686
(Continued)

(56) References Cited

U.S. PATENT DOCUMENTS

| 7,080,141 B1 * | 7/2006 | Baekelmans ....... G06F 11/0709 709/202 |
| 8,014,320 B2 * | 9/2011 | Farkas ................ H04L 12/4641 370/256 |

(Continued)

FOREIGN PATENT DOCUMENTS

| CN | 1874345 A | 12/2006 |
| CN | 102316004 A | 1/2012 |

(Continued)

OTHER PUBLICATIONS

English Bibliography for Japanese Patent Application Publication No. JP2009521884A, published Jun. 4, 2009, printed from Thomson Innovation on Feb. 19, 2016, 4 pp.
(Continued)

*Primary Examiner* — Atta Khan
(74) *Attorney, Agent, or Firm* — Fay Sharpe LLP (57) ABSTRACT

Embodiments relate to a concept for a communication network, the communication network comprising a plurality of network entities. It is provided, from an event subscribing network entity (100) to an event publishing network entity (150) of the communication network, an event subscription message (110) comprising information identifying the event subscribing network entity (100) and comprising configuration rules for configuring a configurable event of interest at the event publishing network entity (150), wherein the configurable event of interest (160) shall be reported from the event publishing network entity (150) to the event subscribing network entity (100). Further it is provided the configurable event of interest (160) from the event publish- (Continued)

ing network entity (150) to the event subscribing network entity (100).

18 Claims, 4 Drawing Sheets

(51) Int. Cl.
*H04L 29/08* (2006.01)
*H04L 12/751* (2013.01)
*H04L 12/759* (2013.01)
*H04L 12/717* (2013.01)

(52) U.S. Cl.
CPC ............ *H04L 45/02* (2013.01); *H04L 45/028* (2013.01); *H04L 45/42* (2013.01); *H04L 67/10* (2013.01); *H04L 67/16* (2013.01); *H04L 67/26* (2013.01); *H04L 41/06* (2013.01)

(58) Field of Classification Search
USPC ......................................................... 709/221
See application file for complete search history.

(56) References Cited

U.S. PATENT DOCUMENTS

| | | | | |
|---|---|---|---|---|
| 8,559,324 | B1* | 10/2013 | Brandwine | H04L 12/1432 370/252 |
| 8,923,277 | B1* | 12/2014 | Shekhar | H04L 49/10 370/352 |
| 2007/0168550 | A1* | 7/2007 | Wang | H04L 29/06 709/238 |
| 2008/0267202 | A1 | 10/2008 | Lin | |
| 2009/0034419 | A1* | 2/2009 | Flammer, III | H04L 12/2809 370/238 |
| 2011/0022439 | A1* | 1/2011 | Arni | G06F 9/542 705/7.37 |
| 2011/0026437 | A1* | 2/2011 | Roja-Cessa | H04L 45/04 370/256 |
| 2012/0023231 | A1 | 1/2012 | Ueno | |
| 2013/0067056 | A1* | 3/2013 | Purkayastha | H04L 45/025 709/223 |
| 2013/0155880 | A1* | 6/2013 | Hughes | H04L 45/025 370/252 |
| 2014/0372577 | A1* | 12/2014 | Hui | H04L 67/12 709/221 |
| 2015/0019697 | A1* | 1/2015 | Badoni | H04L 41/0856 709/221 |
| 2015/0350015 | A1* | 12/2015 | Clemm | H04L 43/0829 709/221 |
| 2016/0087840 | A1* | 3/2016 | Miller | H04L 41/0813 709/221 |

FOREIGN PATENT DOCUMENTS

| | | |
|---|---|---|
| EP | 2 066 086 A1 | 6/2009 |
| EP | 2756709 B1 | 10/2015 |
| JP | 2009-521884 A | 6/2009 |
| JP | 2011-166661 A | 8/2011 |
| WO | 2011049135 A1 | 4/2011 |
| WO | WO 2012/001511 A1 | 1/2012 |

OTHER PUBLICATIONS

English Bibliography for Japanese Patent Application Publication No. JP2011166661A, published Aug. 25, 2011 printed from Thomson Innovation on Feb. 19, 2016, 4 pp.
English Bibliography for PCT Patent Application Publication No. WO2011049135A1, published Apr. 28, 2011 printed from Thomson Innovation on Feb. 19, 2016, 3 pp.
PCT Pat App No. PCT/EP2013/060498, Written Opinion of the International Searching Authority, dated Sep. 12, 2013 6 pp.
European Pat App No. 12305738, Extended European Search Report, dated Nov. 23, 2012, 4 pp.
Stefan Behnel et al., "On Quality-of-Service and Publish-Subscribe," Proceedings of the $26^{th}$ IEEE International Conference on Distributed Computing Systems and Workshops, 6 pages, XP010927164, 2006.
Bogumil Zieba et al., "Quality-Constrained Routing in Publish/ Subscribe Systems," MPAC '05 Proceedings of the $3^{rd}$ International Workshop on Middleware for Pervasive and Ad-Hoc Computing, pp. 1-8, XP002686379, 2005.
International Search Report for PCT/EP2013/060498 dated Sep. 12, 2013.
English Bibliography for Chinese Patent Application Publication No. CN1874345A, published Dec. 6, 2006, printed from Thomson Innovation on Sep. 29, 2016, 3 pp.
English Bibliography for Chinese Patent Application Publication No. CN102316004A, published Jan. 11, 2012, printed from Thomson Innovation on Sep. 29, 2016, 3 pp.

* cited by examiner

NETWORK ENTITY OF A COMMUNICATION NETWORK

Embodiments of the present invention generally relate to networks and, more specifically, to an enhanced publish-subscribe concept for events in a communication network.

BACKGROUND

A management of resource state and or topology information in distributed systems or networks may have direct impacts on the resource management efficiency. A low frequency of information exchange may lead to a coarse knowledge of the states of the concerning network resources which may reduce the resource management performance. On the other hand a high frequency of information exchange may lead to a more precise knowledge of the resource states but also to more signaling overhead which again reduces the management performance.

Conventional information management between different network nodes and/or clusters of network nodes may take place either per polling, pulling, pushing or advertising. Polling typically refers to actively sampling the status of an external device by a client as a synchronous activity. Polling also refers to the situation where a device is repeatedly checked for readiness, and if it is not, it may be returned to a different task. Pulling refers to a style of network communication where an initial request for data originates from a client, and then is responded to by a server. The reverse is known as pushing or push technology, where the server pushes data to clients.

Conventional networks typically comprise diverse routers and switches with different capabilities and layers, such as, for example, Multi-Protocol Label Switching (MPLS) switches, flow based (OpenFlow=OF) switches, etc. Such an MPLS switch comprises a path computation client to manage its own traffic engineering database and is connected to a Path Computation Element (PCE) which is responsible for path finding and path optimization. An OF switch comprises an OpenFlow protocol client which manages a forwarding information base and is controlled by a remote OpenFlow controller which manages a plurality of OF switches. Thereby OpenFlow denotes a communications protocol that gives access to the forwarding plane (or data plane) of a network switch or router over the network.

In other words, a conventional network environment comprises several incompatible solutions where connections are provided using network management tools, MPLS, GMPLS, OpenFlow, PCE/PCC and others. Many control functionalities are performed either in the network elements themselves or in a variety of incompatible systems, leading to an inefficient use of the network and a non-optimal routing and/or load distribution.

SUMMARY

Embodiments of the present invention may provide an information management concept which may, for example, be used as a generic and flexible generalization of conventional protocols and algorithms for baseband processing pool management, e.g. in cloud computing architectures. On the other hand, embodiments may also be applied to control plane architecture of network domains, wherein the control plane denotes a part of a router architecture that is concerned with path computation and path optimization based on underlying network topology and state of network resources.

Embodiments introduce an information management mechanism based on the publish-subscribe principle. Thereby conventional publish-subscribe denotes a messaging pattern where senders of messages or events, also called event publishers, do not program the messages or events to be sent directly to specific receivers, also called event subscribers. Instead, published events are characterized into predefined classes, without knowledge of what, if any, event subscribers there may be. Similarly, event subscribers express interest in one or more predefined classes, and only receive messages that are of interest, without knowledge of what, if any, event publishers there are. This is completely different with embodiments of the present invention. Here, events or messages to be published to event subscribers may be individually configured and/or updated by the event subscriber according to the event subscriber's needs or desires. That is to say, embodiments do not necessarily require predefined event classes, as events of interest may be configured by subscribers themselves (e.g. on the fly). An event thereby may be defined to be an instantaneous occurrence of interest at a point of time. In general, an event may be associated with a change in a distribution of a related quantity that may be sensed. For example, an event of interest may be related to (processing) resource information and/or to router control plane information. That is to say, an event of interest may, for example, provide information on network topology changes, on capacities of one or more network elements, on packet losses (or data throughput), and/or on processing load of one or more network elements.

Embodiments may hence achieve to integrate the advantages of various information exchange protocols to minimize a required computation effort and a required signaling, and may enable a resource management entity to configure an information exchange between different network elements in a dynamic and adaptive manner according to their individual needs.

According to a first aspect embodiments provide a network entity of a communication network, wherein the communication network comprises a plurality of network entities or elements, such as computing or processing entities, processing resource management entities, routing control entities, or the like. Said network entity, which may regarded as an originating network entity, comprises an interface which is operable to provide (e.g. transmit), to an event publishing network entity/element of the communication network, an event subscription message comprising information identifying said originating network entity and comprising one or more configuration rules for configuring a configurable event of interest at the event publishing network entity, wherein the configurable event of interest shall be reported from the event publishing network entity to the originating network entity. Further, the (originating) network entity may comprise an interface, such as e.g. a receiver interface, which is operable to provide (e.g. receive) the configurable event of interest from the event publishing network entity to said originating network entity. In other words, the originating (or subscribing) network entity, which may be a resource management entity, a network routing controller, or a signal processing entity of the network or a domain thereof, may define, re-define or update an event of interest (or parameters thereof) or its reporting modalities by setting up or updating one or more event configuration rules of the event subscription message. Thereby, the configuration rules may comprise one or more configurable parameters for defining or re-defining the event of interest at the event publishing network entity and/or for defining or re-defining a related event report to the (subscribing) network entity. A configurable parameter may, for example, be from the group of an event threshold, an event hysteresis, an event granularity, a trigger for event notification, a time to trigger, an event notification frequency, and/or a notification content. That is to say, embodiments do not require subscribing to and/or publishing preset or predefined events or event classes. Instead, events of interest may be dynamically and individually (re-)configured by an event subscribing network entity. In this way, events of interest may be dynamically adapted to current needs or states of the network and/or individual network entities thereof.

While the above originating network entity may, according to some embodiments, be regarded as event subscribing network entity, embodiments of the present invention also provide the corresponding event publishing network entity. Said event publishing network entity comprises an interface which is operable to provide (e.g. receive), from the event subscribing network entity of the communication network, the event subscription message comprising the information identifying the event subscribing network entity and comprising one or more (updated) configuration rules for configuring the configurable event of interest at the event publishing network entity, wherein the configurable event of interest shall be reported from the event publishing network entity to the event subscribing network entity. The event publishing network entity also comprises an interface which is operable or adapted to directly or indirectly provide (e.g. transmit) the (re-)configurable subscribed event of interest from the event publishing network entity to the event subscribing network entity. The event publishing network entity or element may, for example, be a processing node of the communication network.

Note that embodiments also comprise a communication network comprising the aforementioned subscribing and publishing network elements. The communication network may in general be any computer network, such as the Internet, for example. Also, the communication network may be a core network communicating with one or more access networks, such as, for example, Radio Access Networks (RANs) of one or more wireless communication systems. The RAN architecture of a wireless communication network may comprise one or more Remote Radio Heads (RRHs), wherein a RRH may be regarded as a radio front-end, i.e., which receives and transmits the actual radio signals and establishes at least one radio cell. Two directions of transmission may be considered. The first one is referred to as downlink or forward link. It refers to a transmission from the RAN, i.e. the RRH, to a mobile terminal or User Equipment (UE) in the coverage area. The second one is referred to as uplink or reverse link. It refers to a transmission from a mobile terminal to the RAN, i.e. the RRH. In the uplink a RRH may convert received radio signals from a transmission-band to baseband receive signals and provide the baseband receive signals to the processing units of the core network. In the downlink the RRH may convert a baseband transmit signal, which has been processed in the core network, to the transmission-band and transmit the signal using one or multiple antennas. The transmission-band may be regarded as a system frequency band with a system bandwidth and a carrier frequency. The transmission-band may comprise a sub-band for downlink transmission and a sub-band for uplink reception of radio signals, as e.g. in a Frequency Division Duplex (FDD) system. In some embodiments the same transmission-band may be used for downlink and uplink, as in a Time Division Duplex (TDD) system.

Embodiments may hence also be employed in conjunction with present or future wireless communication systems, such as, for example, wireless communication systems standardized by the $3^{rd}$ Generation Partnership Project (3GPP), such as the Global System for Mobile Communications (GSM), Enhanced Data rates for GSM Evolution (EDGE), GSM/EDGE Radio Access Network (GERAN), Universal Terrestrial Radio Access Network (UTRAN) or Evolved UTRAN (E-UTRAN), Long Term Evolution (LTE) or LTE-Advanced (LTE-A), or wireless communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms wireless communication system and mobile communication network may be used synonymously. Note that the concept of the present invention is not limited to the aforementioned wireless communication systems but is also applicable to other as well as future wireless communication system standards.

In conventional solutions, there is a 1:1 relationship between a baseband processing unit and a RRH, where the baseband processing capacity is dimensioned according to peak traffic. In some embodiments the RRHs may provide transmission (Tx), reception (Rx) and antenna functions. A RRH may be spatially separated from an associated baseband processing unit as a pool of conventional baseband processing elements so that the latter can be combined within a cloud computing cluster of several baseband processing units. This opens the path to apply technologies of cloud computing, establish distributed or decentralized load balancing/distribution and directly reduce the number of required processing sites and, in parallel, the associated installation cost, but also maintenance and power consumption. Hence, the communication network may also be a distributed cloud computing network comprising a plurality of (signal) processing nodes as network entities. Cloud computing or a cloud computing network may be understood as a technology that may provide computation, software, data access, and storage services that do not require end-user knowledge of a physical location and configuration of the system or network that delivers the services. Hence, cloud computing describes a supplement, consumption, and delivery model for IT services, for example based on Internet Protocols (IP), and typically involves provisioning of dynamically scalable and often virtualized resources.

Separate clusters or domains of processing nodes may comprise dedicated cluster-specific resource management entities for managing and distributing available processing resources among the processing nodes of a processing cluster. That is to say, the network entity may also be the cluster-specific resource management entity subscribing to configurable processing load-related events of the processing nodes. That is to say, processing load information may be exchanged by making use of embodiments of the enhanced publish-subscribe concept. For example, a first processing unit or the resource management entity may subscribe to an individually defined processing-capability-related event, which may be published from a second processing unit of the network, to which a corresponding event subscription message has directly or indirectly been sent from the interested event subscribing network first processing unit. Hence, the configurable event of interest may e.g. be related to a load situation at the event publishing network entity. In this case the originating or subscribing network entity may further comprise a load controller which is operable to distribute processing load among the plurality of network entities based on the reported event of interest.

In other words, some embodiments may provide RAN architecture with RRHs and baseband (signal) processing units forming nodes of a cloud computing architecture. Thereby, via a centralized or decentralized resource management entity for managing processing resources of the cloud, the load of a first processing unit may be at least in part transferred to other nodes or processing units of the network. A decision on which other baseband processing unit may take over (part of) the first baseband processing unit's load may be based on adequate load-related events which have previously been exchanged between the different network nodes. This may increase the flexibility as well as the speed of the traffic distribution for an operator.

In some embodiments the subscribing and/or publishing network entities (e.g. baseband processing units) may each be (directly or indirectly) coupled to at least one Remote Radio Head of the wireless communication system. Thereby, a RRH may, for example, comprise a radio transceiver for a GSM, an EDGE, a UMTS, an LTE or an LTE-A cellular communication system. Of course, the RRH may also serve at least one cell of a future wireless communication system. The at least one RRH may be coupled to a baseband processing unit for exchanging complex valued digital baseband data between the baseband processing unit and the at least one RRH. For that purpose, an interface known as common public radio interface (CPRI) may be used, for example.

Additionally or alternatively embodiments may also be used for dynamic network routing optimization. In such embodiments the configurable event of interest may be related to a network routing or topology, i.e. to the routing control plane. A network entity according to embodiments may then further comprise a Dynamic Control Unit (DCU) for dynamically controlling the network routing within the communication network based on the reported configurable event of interest from individual network nodes of the network (domain). Such a control unit may comprise a request processing entity which is operable to receive a request coming from a further network entity/element and which is operable to perform processing of said request. The control unit may further comprise a Path Computation Entity (PCE) which is operable to compute a network path upon request from the request processing entity, based on a network graph and applying constraints, which may either be administrative-oriented (policy routing), or service-oriented (QoS routing). Said computed network path comprises a number of said plurality of network entities; said path computation entity being linked with a Traffic Engineering Database (TED) which is updated based on the reported configurable event of interest and/or the computed network paths. Thereby the path computation entity and/or the TED may also take the latest received control-plane-related events of interest into account which the DCU may have configured and subscribed to. A Dynamic Flow Control (DFC) entity of the network entity may be operable to establish a forwarding entry in the forwarding information base of a network entity of the computed network path, upon request from the request processing entity.

In a possible embodiment a forwarding entry may be established in each network element of the computed network path. According to another variant, a forwarding entry may only be established in a limited number of network elements, and e.g. only in the requesting network element of the computed network path. In that way there may be suboptimal paths established but with less signaling and processing load. Depending on e.g. the stability of the network and the sensibility of the network to changes, either one of those variants may be preferred.

Using such a control unit, the routing control functionalities in the network elements can be kept very simple and all network elements can address the same control unit for computing or setting of a path. This allows for reacting dynamically e.g. on congestion or failures and for finding the best path for a flow of given packets. Thereby the decision on a path may be determined based on the latest administrative-oriented or service-oriented events in the network, wherein the events of interest can be individually and dynamically defined by the subscribing control unit.

According to some embodiments the request processing entity may further be adapted to communicate with the TED for requesting and retrieving a path from said database. If the request processing entity and TED are located within the same network node, this can be done using e.g. Structured Query Language (SQL). If the TED and PCE are located in a different node the communication may pass through the PCE. The request processing entity may typically be further adapted to communicate with the path computation entity and the flow control entity using internal control unit messages.

The request processing entity may comprise a control plane mechanisms entity to translate an incoming request from a network element into an internal request message; and a dispatcher and coordinator entity to obtain a path from the TED in accordance with the internal request message. Thereby the TED may continuously be updated in accordance with the subscribed configurable events. The dispatcher and coordinator entity may then be further adapted to trigger a path computation by the path computation entity if the requested path is not available in the traffic engineering database.

According to a preferred embodiment the path computation entity is a PCE (Path Computation Element), preferably as defined in RFC4655. The request processing entity may then be adapted to communicate with the PCE (Path Computation Element) through a PCE protocol, as defined in RFC5440. Also the PCE may be linked with a central traffic engineering database storing current resource and traffic information which may be updated centrally based on the subscribed configurable events, so there is no need for having a local TED in the network elements. A possible operation of the TED is explained in more detail in RFC4655, and in the IETF internet draft entitled "Traffic Engineering Database Management Information Base in support of GMPLS".

According to some embodiments the request processing entity may comprise a RSVP (Resource Reservation Protocol) instance. The RSVP protocol is defined in RFC2205.

The TED may comprise a Generalized Multi-Protocol Label Switching (GMPLS) instance. In that way cross-technology routers do not need to have the GMPLS functionality inside their router.

The request processing entity may be further adapted to receive and interpret PCE protocol messages and/or Open-Flow protocol messages from network elements. In that way backward compatibility with existing network elements having a PCE client or an OF client may be guaranteed.

According to yet a further aspect of the present invention, it is provided a method for a communication network, wherein the communication network comprises a plurality of network entities. The method comprises a step of providing, from an event subscribing network entity to an event publishing network entity of the communication network, an event subscription message comprising information identifying the event subscribing network entity and comprising configuration rules for configuring a configurable event of interest at the event source publishing entity, wherein the configurable event of interest shall be reported from the event publishing network entity to the event subscribing network entity. Further, the method may comprise a step of providing the configurable event of interest from the event publishing network entity to the event subscribing network entity.

Some embodiments comprise one or more programmable digital control circuits installed within the network entities for performing the method. Such a programmable digital control circuit, for example a digital signal processor (DSP), a Field Programmable Gate Array (FPGA), or a general purpose processor with hardware accelerators, needs to be programmed accordingly. Hence, yet further embodiments also provide a computer program having a program code for performing embodiments of the method, when the computer program is executed on a programmable hardware device.

Embodiments enable highly dynamic and adjustable event information exchange tailored to the specific needs of the network environment with optimized overhead. Furthermore, embodiments can be used in different network environments for quick and automated network management, such as load or routing management, for example.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
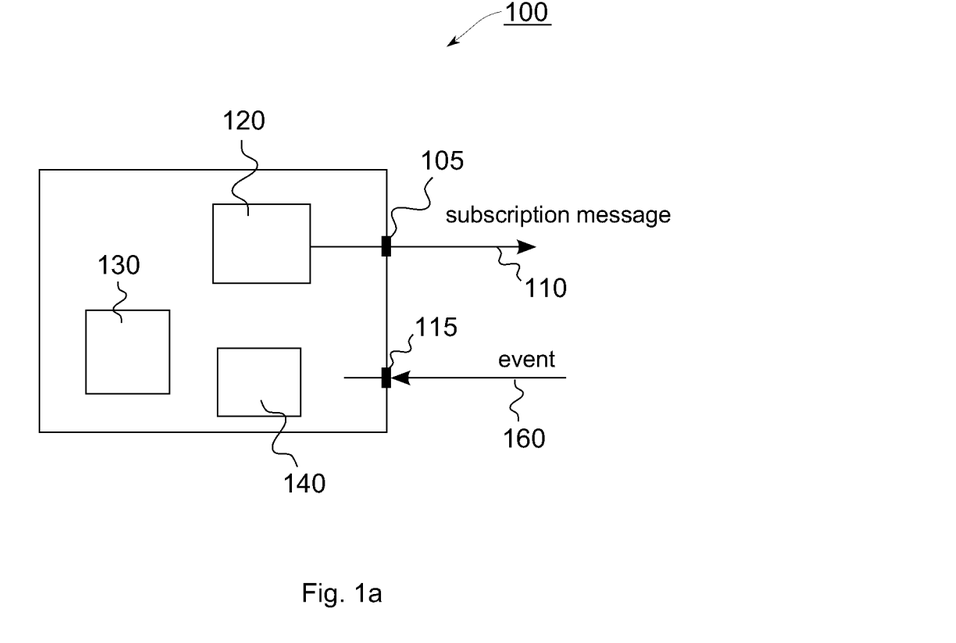
FIG. 1a shows an event subscribing network entity for sending a freely configurable event subscription message according to an embodiment.

FIG. 1a illustrates a block diagram of a network entity 100, which may function as a network node of a communication network. Thereby the communication network may comprise a plurality of network entities or network elements, such as computing nodes, resource management entities and/or routing controller entities.

The network entity 100 comprises an interface 105 which is operable, to provide, to an event publishing network entity 150 (see FIG. 1b) of the communication network, an event subscription message 110, wherein the event subscription message 110 comprises information identifying the (originating) network entity 100 and wherein the event subscription message 110 further comprises one or more configuration rules for configuring a configurable event of interest at the event publishing network entity 150. Thereby, the configurable event of interest shall be reported or published from the event publishing network entity 150 to the originating (i.e. subscribing) network entity 100. Further, the network entity 100 comprises an interface 115, which is operable to provide the configurable event of interest from the event publishing network entity 150 to the network entity 100. The interface 105 may comprise a transmitter operable to transmit the event subscription message from the network entity 100 to the event publishing network entity 150. Likewise, the interface 115 may comprise a receiver operable to receive the published event of interest from the event publishing network element 150. Hence, the network entity 100 may be regarded as an event subscription network entity, i.e., a network entity subscribing to a self-configurable event of interest.

In some embodiments the event subscribing network entity 100 can be a central routing controller or a processing resource management element of a network domain or a signal processing cluster. For managing network paths and/or processing resource the network entity 100 requires getting knowledge of states of the individual network elements of the domain or the cluster. According to embodiments this may be achieved via the proposed Enhanced Publish-Subscribe Information Exchange (EPSIE), wherein the event subscribing network entity 100 may configure and/or reconfigure its event of interest (i.e. state information of interest) according to its current information needs. That is to say, the configurable event of interest is not a fixed or a fixed class of events, but is adaptive to current information demands. In general the configurable event of interest may be any event related to a resource state of one or more event publishing network entities of the network domain or cluster. Thereby a resource state may relate to data processing capabilities, such as data buffering or digital signal processing, for example.

Figure 1B:
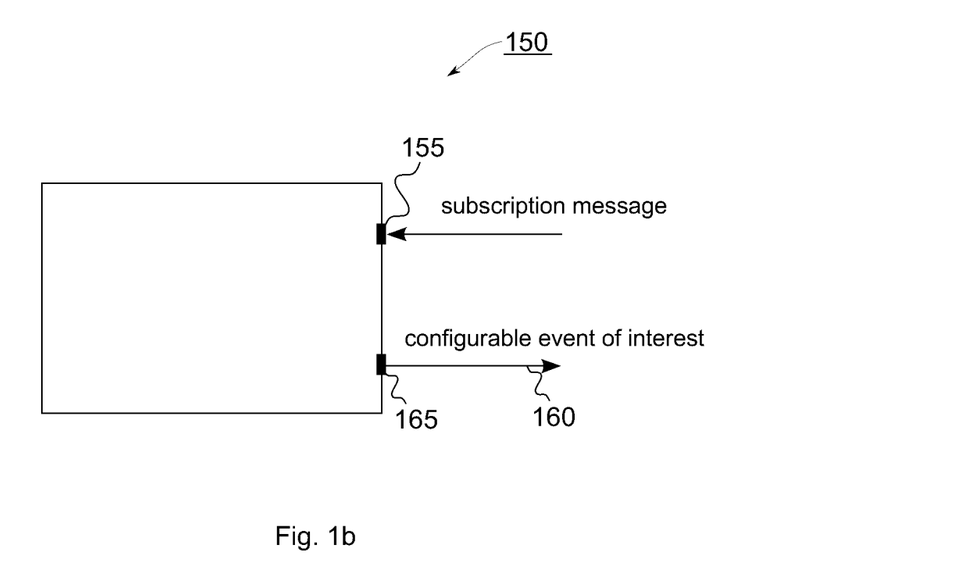
FIG. 1b shows an event publishing network entity for receiving a freely configurable event subscription message according to an embodiment.

A corresponding event publishing network element 150 is sketched by FIG. 1*b*. The event publishing network element 150 comprises an interface 155 which is operable to provide, from the event subscription network entity 100, the event subscription message 110 comprising the information identifying the event subscribing entity 100 and comprising at least one configuration rule for configuring the configurable event of interest at the publishing network entity 150. Further, the event publishing network element 150 comprises an interface 165 which is operable to provide the configured event of interest 160 from the event publishing network entity 150 to the event subscribing network entity 100. Here, the interface 155 may comprise a receiver operable to receive the event subscription message or profile 110, wherein the interface 165 may comprise a transmitter adapted to transmit or notify the event of interest 160 to the event subscribing network entity 100.

Figure 2:
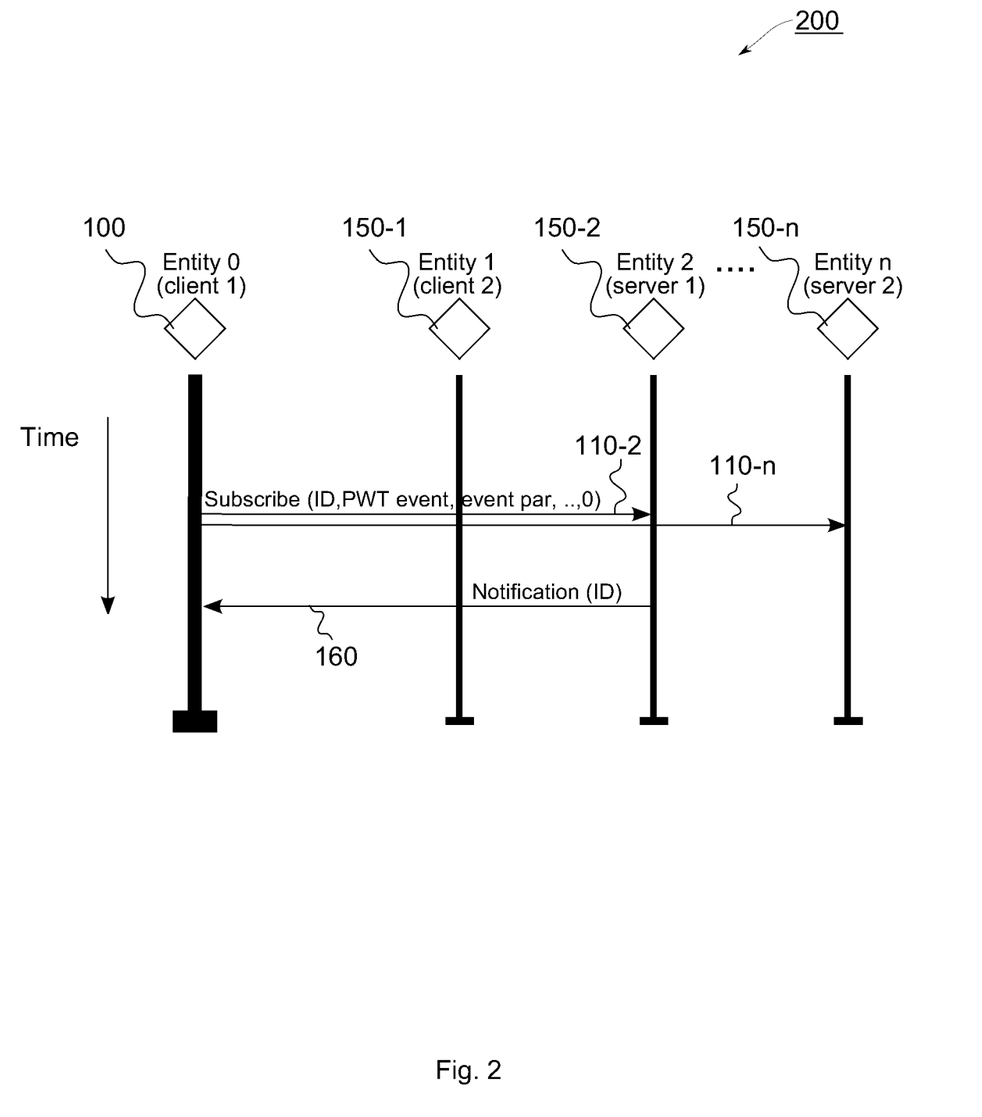
FIG. 2 shows a message sequence chart for en embodiment of a method for a communication network.

Turning now to FIG. 2, it is considered a communication between an event subscribing network entity (event client) 100 and a plurality of event publishing network entities (event servers) 150-2, . . . , 150-*n*. These network entities may either be co-located on a same hardware, as, for example, a channel board serving one or more remote radio heads of a wireless communication system, or they may be located at different sites of the network, as for example on different channel boards at different geographic locations. That is to say, the two network entities 100 and 150 may be located on the same network node or on different network nodes, in the same cluster of nodes or in different clusters.

The message sequence chart 200 of FIG. 2 illustrates various network entities 100, 150-1, 150-2, . . . , 150-*n*. In this exemplary scenario network entity 100 serves as event subscription network entity, while network entities 150-2 and 150-*n* function as event publishing entities. Network entity 100 may be interested in specific events of network entity 150-2 and 150-*n*, respectively, wherein the event client 100 may configure the events of interest on its own by sending corresponding event subscription messages 110. For this purpose a network message configuration module 120 of the network entity 100 may set up event-specific subscription messages 110-2 and 110-*n*, respectively. This may be for example the case, if network entity 100 needs particular state information of the network entities 150-2 and 150-*n*. This state information may be obtained by compiling, for a configurable event of interest, an event subscription profile or message 110 in which network entity 100 may define its identity (e.g. a network-, IP-address) and relevant parameters for the event reporting. In other words, the at least one configuration rule of the event subscription message 110 may comprise one or more configurable parameters for defining or re-defining the event of interest at the event publishing entity 150 and/or for defining or re-defining a related event report to the event subscribing network entity 100. In the example of FIG. 2 the client 100 having the identifier ID is interested in "PWT" (Processing Waiting Time) event, The configurable event parameters event par may, for example, be event thresholds, an event hysteresis, an event granularity, triggers for event notification, a time to trigger, a notification frequency, a notification content, etc. According to the exemplary embodiment of FIG. 2 event notification content has been set to "0", such that the published event notification 160 only comprises the ID of the event publishing network entity 150-2.

For example, a configurable event of interest could also be a Signal-to-Interference-plus-Noise Ratio (SINR) above or below a given threshold for less or more than a given time threshold. Thereby, such threshold values may be configurable event parameters of the event subscription message 110. If the event subscribing network entity 100 is no longer interested in outdated event threshold values, it may, for example, issue a new or updated event subscription message 110 comprising its new event parameters of interest. Another example of an event of interest (see FIG. 2) could be a PWT (Processing Waiting Time) below or above a configurable waiting time threshold for more or less than a configurable time threshold. Also, those values or parameters could be changed or updated in order to fit the subscribed configurable event to the current interests of the event subscribing network entity 100. Some of the parameters of the event subscription message may be optional while others are mandatory. In some embodiments the ID of the event subscribing network entity 100 may be a mandatory parameter of the event subscription message 110.

Whenever an event of interest, as defined by the event subscribing network entity or client 100 in the subscription profile 110, occurs, the event publishing network entity or server 150 may send a notification message 160 only to those subscribing entities who have expressed their interest in this event by previously sending their subscription profile 110. The notification message 160 may contain the type and the amount of information as configured or defined by the event subscribing network entity 100 in the event subscription message 110. The event notification or report 160 may either comprise a simple message indicating a change of the publishing entity's state or the entire state parameters. The content of the event notification 160 may have been configured beforehand by corresponding parameters in the event subscription message 110. For example, an event subscribing network entity 100 may be informed that a packet loss value or a buffer fill level of a certain event publishing network entity 150 has just fallen below a critical threshold value. Another example would be to inform an interested event subscribing network entity 100 that signal processing resources available at the respective event publishing network entity 150 are above a previously configured threshold value. That is to say, a published event notification 160 may include the event publishing network entity's ID, measured values, as for example a processing queue waiting time. Some parameters may be optional, while others may be mandatory. In some embodiments the ID of the reporting event publishing network entity 150 may be a mandatory parameter comprised by the notification 160. Additionally or alternatively, a notification frequency may be mandatory. In this way, the event subscribing network entity 100 may obtain knowledge on what is happening at the individual event publishing network entities 150.

For example, a notification frequency may be set to "1" in order to obtain an event notification message 160 once (per second) from the respective event publishing network entity 150. This may be referred to as pull- or period-based EPSIE. A specific value for the "notification frequency" may e.g. automatically trigger related values for other event subscription parameters. For example, notification frequency="1"

may lead to sending the subscribe message 110 with default values for one or more other parameters, e.g. event threshold=NULL, event hysteresis=NULL, event granularity=NULL, trigger for event notification=NULL, time to trigger=NULL, etc. The latter parameters are optional and do not need to be explicitly defined in the event subscription message 110. If a non-mandatory parameter is not specified it may be set to NULL. The "notification content"-parameter of the message 110 may be set to the event or status information of interest, e.g., "available processing resources". In this case the event notification message 160 may return the instantaneous situation or status with respect to the status information of interest (e.g. available processing resources) at the event publishing network entity 150. That is to say, the event publishing network entity 150 may return its current status with respect to the event of interest, e.g. "available processing resources=52%". Likewise, the notification frequency may be set to "10" in order to obtain ten event notification messages 160 (per second) from the respective event publishing network entity 150 with respect to the specified information of interest. Also, specifying the notification frequency to be "0" without any further parameter settings may delete a previous subscription (i.e. not to obtain any related published event notification 160).

In contrast, specifying the notification frequency to be "0" together with further parameter settings may initiate event-based EPSIE. For example, a certain event may be specified by setting event threshold=80%, event hysteresis=5%, event granularity=0, trigger for event notification=available processing resources>event threshold, time to trigger=10 ms, notification content=0. In this case the event notification message 160 may only comprise the ID of the event publishing network entity 150 indicating that the specified event has occurred.

Another event subscription message could comprise event threshold=NULL, event hysteresis=NULL, event granularity=10%, trigger for event notification=available processing resources @ (time n) exceed available processing resource @ (time n−1)+event granularity, time to trigger=10 ms, notification content=0. Also in this case the resulting event notification message 160 may only comprise the ID of the event publishing network entity 150 indicating that the specified event has occurred.

FIG. 2 shows an example for an enhanced publish-subscribe scenario according to an embodiment of the present invention. Here the subscription messages 110-2 and 110-n have been issued for the previously-described PWT event. As can be seen, a parameter corresponding to the notification content may be set to "0", indicating a simple feedback. Therefore, the notification of the event publishing network entity 150-2 only comprises the ID of the network entity 150-2, if the previously configured PWT event occurs.

Note that network entity 100 may always have the freedom to redefine the configurable parameters of the event subscription message 110 by updating the corresponding entries.

As has been explained above, the configurable event of interest may be related to a network routing or to a routing control plane, i.e., that part of a router architecture that is concerned with drawing the network map, or the information in a routing table that defines what to do with incoming packets. In such embodiments the network entity 100 may further comprise a control unit 130 for dynamically controlling the network routing within the communication network based on the recorded configurable event of interest.

Now an embodiment of the Dynamic Control Unit (DCU) 130 will be described referring to FIG. 3. Such a DCU 130 may, for example, be placed as a central element in a network domain of a core network having attached thereto one or more access networks, such as RANs. The term "central" and "unit" do not imply that all elements of the DCU 130 need to be located at the same location, but only means that the DCU 130 appears as a central unit to the network elements of the network domain. The DCU 130 may be adapted to contain both Path Computation Element (PCE) functionalities and Dynamic Flow Control (DFC) functionalities. The DCU 130 may comprise a PCE module 301 and a DFC module 302. The PCE module 301 may be linked with a Traffic Engineering Database (TED) 303 which may contain topology and resource information of the network domain. The TED 303 may be updated based on reports 160 of subscribed events. A request processing entity 304 may be adapted to receive and interpret all requests arriving at the DCU 130 and to dispatch those requests, for example to the PCE module 301 or the DFC module 302. In case of an explicit request to set up a network path, for example requested by a network management system, the request may be directly forwarded to the DFC module 302.

In case of a request for a constraint-based path calculation, the request may be transmitted to the PCE module 301. According to some embodiments, a communication between the request processing entity 304 and the PCE module 301 may be performed according to the PCE protocol language. This may have the advantage that the communication with a remote PCE may also be possible. The conversion of a request arriving at the central control unit into PCE protocol language may be done from an interpreter in the request processing entity 304.

The DCU 130 may enable a dynamic routing and an easy configuration. The DCU 130 may perform separation of the data plane and the control plane by typically comprising substantially all of the control plane mechanisms into one single entity 130.

A more detailed explanation on the operation of the DCU 130 will now be given with reference to FIG. 4. In the DCU 130 there may be provided a request processing entity 304, comprising a Control Plane Mechanism (CPM) entity 404 and a Request Dispatcher and Coordinator (RDC) entity 405. When a path request 411 is received at the DCU 130, the CPM entity 404 may forward the request to the RDC entity 405 which may be arranged for processing the incoming requests 411. In case of an explicit request to set up a path, the request may be sent to the DFC 402, see arrow 416. If it is a path retrieval request, the RDC entity 405 may first check if the requested path is available in the TED 403, see arrow 415, and retrieve the path if available, whereupon the path may be sent to the DFC 402, see arrow 416. If the requested path, however, is not available in the TED 403, a path computation may be triggered, see arrow 413. Upon receiving a trigger for a path computation the PCE 401 may calculate a path using path computation constraints, see arrow 418, received from the TED 403, and deliver the calculated path to the TED 403, see arrow 414. The RDC entity 405 may be adapted to wait for a predetermined period of time larger than the time needed for the calculation and delivering before retrieving the calculated paths from the TED 403. According to a non-illustrated variant, the PCE 401 may be adapted to also deliver the calculated path to the RDC entity 405, that is, arrow 413 would then have to point in both directions.

Generally, the PCE 401 may be adapted to perform multivariable optimization with gradually increasing complexity, and to generate a predefined number of quasi-optimum paths based on default path requirements. The latter task may be performed in a default state of the PCE 401, and the PCE may move to a transient state when receiving an explicit path request for calculating the requested path. After calculation, the PCE 401 may deliver the path to the TED 403, see arrow 414. The RDC 405 may further be arranged for retrieving a calculated, predefined or pre-calculated path from the TED 403, see arrow 415, and for delivering this path to the DFC 402.

The TED 403 may reflect the complete resource and topology information of the network domain and also may contain the calculated paths of the PCE 401. The consistency of the TED 403 may be ensured from subscriptions to configurable events related to topology and/or resource information, as, for example capacity, packet losses, load state, etc., see arrow 160. The resource and topology information is published from publishing network entities 150 to the DCU 130 comprised by the subscribing network entity 100. In the DCU 130 the ASF (Advertisement Supporting Functionality) 406 may interpret the incoming subscribed events 160 from the publishing network entities 150 and derive resource and topology information for storage in the TED 403. Thereby, the resource and topology information may be updated by the network elements according to the DCU's desires or may be triggered from resource and topology changes.

Figure 3:
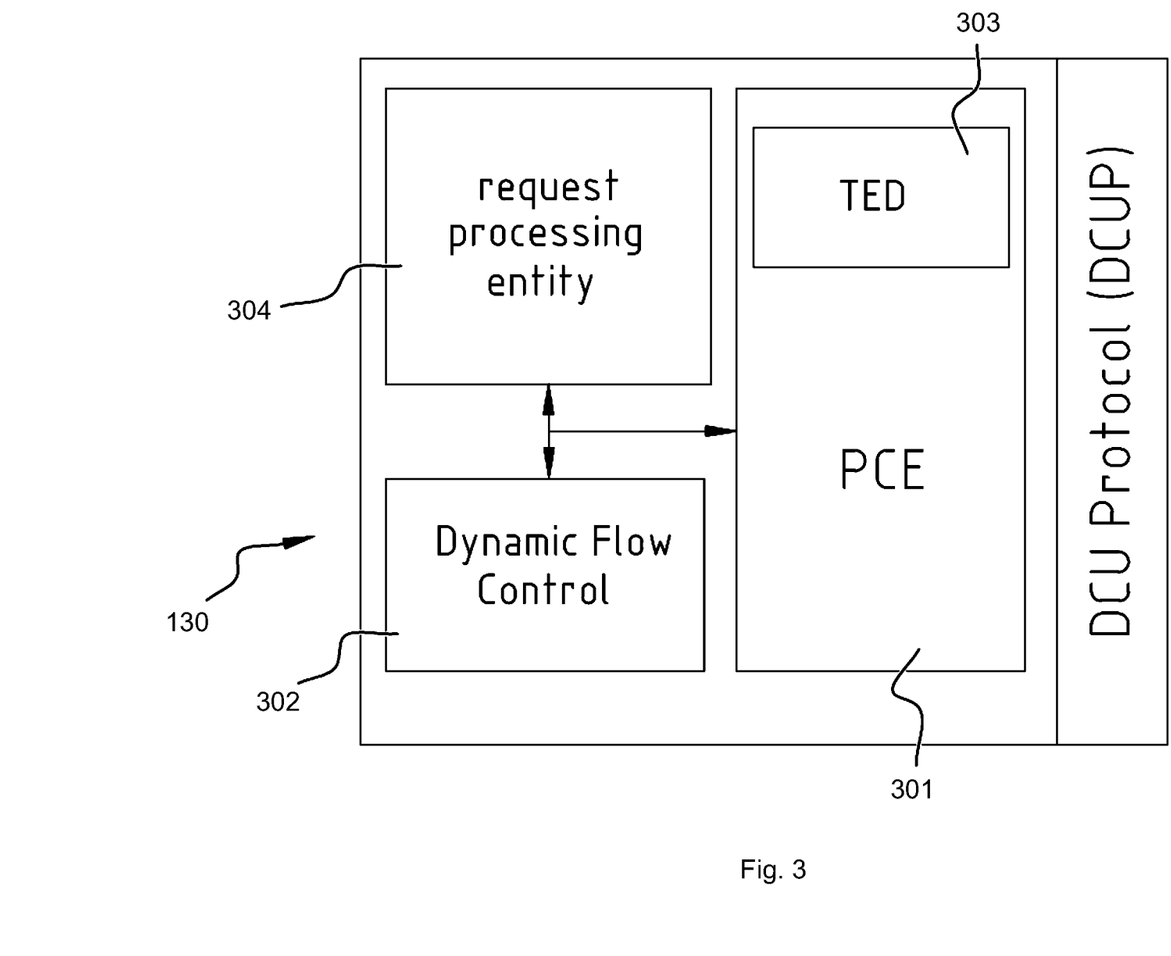
FIG. 3 illustrates a block diagram of a dynamic control unit according to an embodiment.
Figure 4:
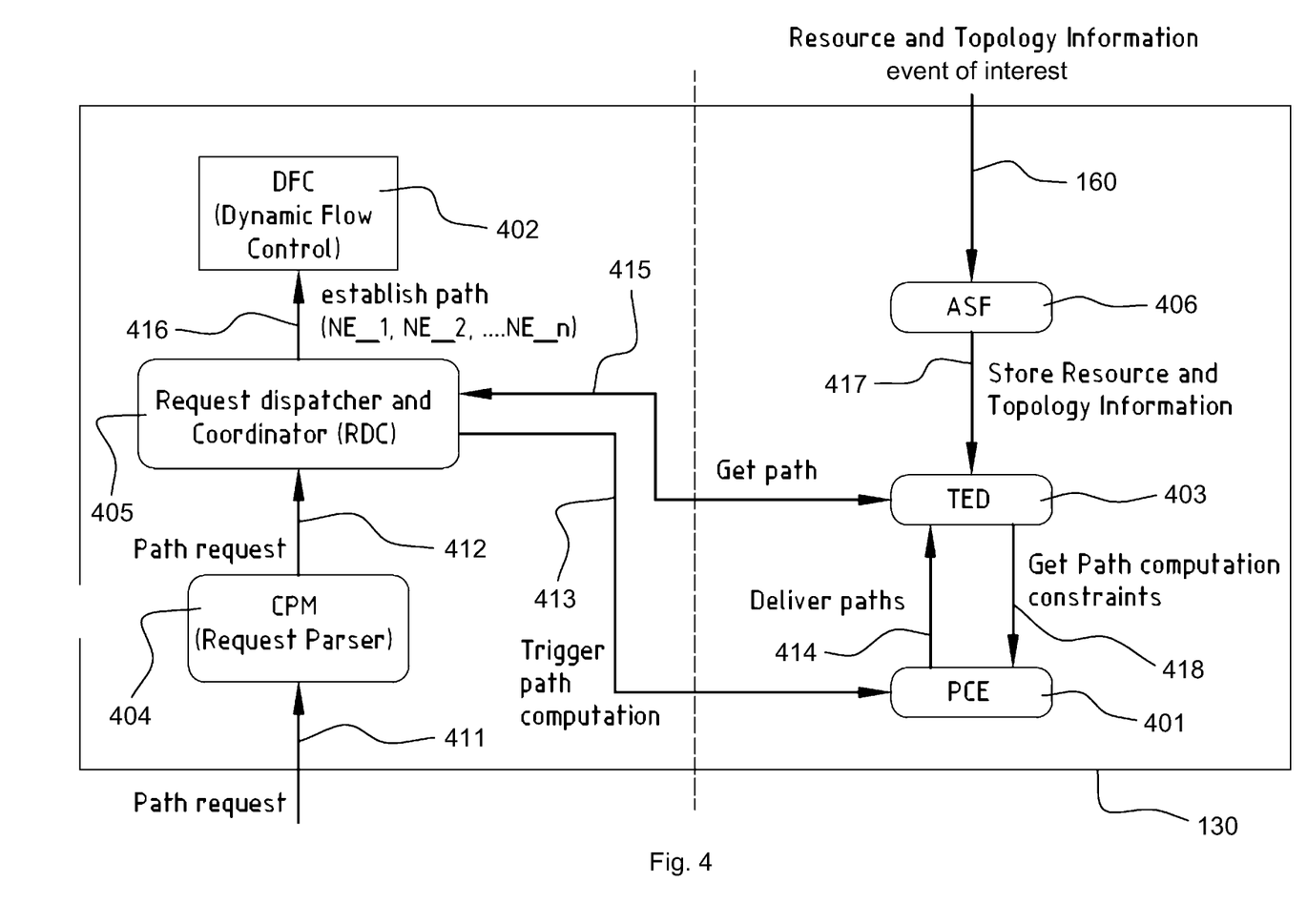
FIG. 4 illustrates a more detailed block diagram of a dynamic control unit of FIG. 3.

While some embodiments may be used for controlling network routing, as has been explained referring to FIGS. 3 and 4, other embodiments may be used for processing capacity or load management among different processing units of a network or network clusters. In such embodiments the control unit 130 may additionally or alternatively comprise a load controller which is operable to distribute a processing load among the plurality of network entities of the communication network based on the reported event of interest. In such a case, the configurable event of interest may be indicative of an available processing capability of the event publishing network entity, wherein the available processing capabilities deceeds (i.e. is below) or exceeds (i.e. is above) a predefined processing capability threshold.

That is to say, according to some embodiments the control unit 130 may be regarded as the main processing resource manager of a baseband processing cluster. It may manage the entire baseband signal processing resources of the cluster comprising the plurality of baseband signal processing units. The control unit 130 may comprise an Information management Entity (IE) which may be operable to determine available baseband processing resources of its associated cluster as well as remote clusters based on monitored and reported signal processing resource status information provided from the event publishing processing units of the associated or remote cluster. Further, the control unit 130 may comprise a Decision Entity (DE) which is operable to assign requested signal processing tasks or externally requested signal processing tasks to one or more of the baseband signal processing units based on the unit-specific resource or load status information provided by the event notifications. In other words, the DE of the control unit 130 may be responsible for the assignment of resource requests and may select appropriate baseband signal processing units by comparing the resource requests or respective demanded processing resource capacities with the unit-specific load status information communicated via the event notifications. Hence, in some embodiments, the network entity 100 may be operable, upon receiving the configurable event of interest from the event publishing network entity 150, to transfer at least a part of a baseband processing task from a first baseband processing unit to a second event processing unit comprising the event publishing network entity 150, if processing resources of the first processing unit are not sufficient for a processing task and if the configurable and received event of interest indicates an available processing capability of the second baseband processing unit comprising the event publishing network entity above a predefined processing capability threshold. Thereby the distribution of processing load may be within or even beyond baseband processing cluster boundaries.

In such embodiments, the network entity 100 may further comprise a neighbor provision unit 140 (see FIG. 1a) which is operable to provide information on at least one second neighboring network entity neighboring a first network entity of the communication network, when the at least one second neighboring network entity fulfills a neighborhood criterion of or relative to the first network entity (e.g., the network entity 100 may be the first network entity). Thereby, the neighbor provision unit 140 may be operable to provide the information on the at least one second neighboring network entity based on a signal propagation delay measurement between the first network entity and a plurality of further network entities of the domain or cluster, such that a signal propagation delay between the first and the at least one second neighboring network entity falls below a predefined maximum signal propagation delay threshold. In this way a list of adequate second processing units may be generated, wherein the second processing units are suitable for taking over signal processing tasks of the first processing unit. That is to say, the neighbor provision unit 140 may conduct signal propagation delay measurements from the first signal processing unit to second signal processing units of the network or the domain thereof in order to find suitable second signal processing units fulfilling given timing requirements, such as real time requirements, for the signal processing.

Such embodiments may for example be useful for load distribution among various baseband processing units, wherein each processing unit may be coupled to at least one remote radio head of a wireless communication system, and wherein each of the processing units or network entities is operable to process radio bearer related baseband data of at least one associated user of the wireless communication system. Data services may be associated with a bearer specifying the corresponding configuration and/or radio resource of the physical layer (PHY) and Layer 2 (L2) in order to fulfill certain quality of service requirements for the different services. The bearers are mapped onto physical carriers. One physical carrier may support several multiplexed bearers. For example, different bearers may be mapped on some disjoint sub-frames within a radio frame.

To summarize, embodiments of the present invention may relieve an event subscribing entity (client entity) from information exchange with one or more event publishing network entities (servers) in time critical phases of decision making. After receiving a routing or load distribution request, a client entity 100 may have to accomplish a resource allocation as soon as possible. It is possible to configure the proposed enhanced publish-subscribe information exchange in a way that information collection occurs either in advance of a request arrive or after the arrival of a request. In the first case, all information necessary for a resource allocation is already available. Concerning operation delay, the proposed enhanced publish-subscribe information exchange may outperform conventional algorithms, as it may shift the information retrieval and sorting process out of the critical decision phase.

The event notification 160 may automatically be transmitted to the event subscribers 100 as soon as the previously-configured profile conditions are satisfied, for example, event attributes, notification frequency, etc. The enhanced publish-subscribe information exchange according to embodiments may allow to adjust the notification frequency and the size of the notification message 160 to an optimum, for example, in dependence of a current link or processor load situation. The clients 100 may calibrate their communication with the servers 150 according to their needs by updating the corresponding entries in their message subscription profiles 110.

By decoupling the information exchange from the time-critical decision phase the proposed concept may enable a client 100 to apply more advanced and more complex resource allocation algorithms resulting in a higher resource optimization quality.

The enhanced publish-subscribe information exchange may abstract conventional request/response mechanisms, for example, if the notification frequency is set to "1" in the subscription profile (see description above). In this case a general status information of interest may be retrieved from the specified network node. In other words, the conventional request/response information exchange may be regarded as a special case of the proposed enhanced publish/subscribe information exchange.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant). For example, "a means for receiving" may comprise dedicated receiver hardware.

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An event subscribing network entity for use in a communication network, the event subscribing network entity comprising:
   at least one processor and associated memory;
   an output interface configured to send communications via a communication network, the communication network including a plurality of network entities, the plurality of network entities including an event publishing network entity; and
   an input interface configured to receive communications via the communication network;
   wherein the at least one processor is configured to send an event subscription message to the event publishing network entity via the output interface, wherein the event subscription message includes information identifying said event subscribing network entity and configuration rules for configuring a configurable event of interest at the event publishing network entity, the configurable event of interest being adaptive to current information demands;
   wherein the event publishing network entity is configured to report the configurable event of interest to said event subscribing network entity in an event notification message;
   wherein the at least one processor is configured to receive the event notification message from the event publishing network entity via the input interface;

wherein the configuration rules comprise one or more configurable parameters for defining or re-defining the configurable event of interest at the event publishing network entity and/or for defining or re-defining reporting of the configurable event of interest published to said event subscribing network entity;

wherein the configurable event of interest is related to a processing load situation at the event publishing network entity;

wherein the at least one processor is configured to distribute processing load among the plurality of network entities based on the reporting of the configurable event of interest by the event publishing network entity;

wherein the at least one processor is configured to transfer at least a part of a baseband processing task from a first network entity to the event publishing network entity after receiving the reporting of the configurable event of interest if processing resources of the first network entity are not sufficient for a processing task and if the reporting of the configurable event of interest received indicates an available processing capability of the event publishing network entity above a predefined processing capability threshold.

2. The event subscribing network entity according to claim 1, wherein the one or more configurable parameters are from the group of an event threshold, an event hysteresis, an event granularity, a trigger for event notification, a time to trigger, an event notification frequency, and/or a notification content.

3. The event subscribing network entity according to claim 1, wherein the configurable event of interest is related to a published routing control plane, wherein said at least one processor is configured to dynamically control network routing within the communication network based on the reporting of the configurable event of interest.

4. The event subscribing network entity according to claim 3, wherein the at least one processor is configured to receive a request from a further network entity via the input interface and configured to process said request;

wherein the at least one processor is configured to compute a network path based on the processing of the request, a network graph, and path computation constraints, said computed network path comprising a number of said plurality of network entities, said at least one processor being linked with a traffic engineering database which is updated based on the reporting of the configurable event of interest and/or the computed network path;

wherein the at least one processor is configured to establish a forwarding entry in a forwarding information base of a select network entity of the computed network path based on the processing of the request.

5. The event subscribing network entity according to claim 4, wherein the at least one processor is configured to communicate with the traffic engineering database for requesting and retrieving a path from said database.

6. The event subscribing network entity according to claim 1, wherein the configurable event of interest is indicative of an available processing capability of the event publishing network entity, the available processing capability deceeding or exceeding a predefined processing capability threshold.

7. The event subscribing network entity according to claim 1, further comprising:

a neighbor provision processor configured to provide information on at least one second neighboring network entity neighboring a first network entity of the communication network, wherein the at least one second neighboring network entity fulfills a criterion used by the first network entity to define its neighborhood.

8. The event subscribing network entity according to claim 7, wherein the neighbor provision processor is configured to provide the information on the at least one second neighboring network entity based on a signal propagation delay measurement between the first network entity and a plurality of further network entities of the communication network, such that a signal propagation delay between the first and the at least one second neighboring network entity falls below a predefined maximum signal propagation delay threshold.

9. The event subscribing network entity according to claim 1, wherein the communication network is a wireless communication network, wherein at least one network entity is coupled to at least one remote radio head of the wireless communication system, wherein the at least one network entity is configured to process radio bearer related baseband data of at least one associated user of the wireless communication system.

10. An event publishing network entity for use in a communication network, the event publishing network entity comprising:

at least one processor and associated memory;

an input interface configured to receive communications via a communication network, the communication network including a plurality of network entities, the plurality of network entities including an event subscribing network entity; and an output interface configured to send communications via the communication network;

wherein the at least one processor is configured to receive an event subscription message from the event subscribing network entity via the input interface, wherein the event subscription message includes information identifying the event subscribing network entity and configuration rules for configuring a configurable event of interest at the event publishing network entity, the configurable event of interest being adaptive to current information demands;

wherein the at least one processor is configured to report the configurable event of interest in an event notification message;

wherein the at least one processor is configured to send the event notification message to the event subscribing network entity via the output interface;

wherein the configuration rules comprise one or more configurable parameters for defining or re-defining the configurable event of interest at the event publishing network entity and/or for defining or re-defining reporting of the configurable event of interest published to said event subscribing network entity;

wherein the configurable event of interest is related to a processing load situation at the event publishing network entity;

wherein the event subscribing network entity is configured to distribute processing load among the plurality of network entities based on the reporting of the configurable event of interest by the event publishing network entity;

wherein the event subscribing network entity is configured to transfer at least a part of a baseband processing task from a first network entity to the event publishing network entity after receiving the reporting of the configurable event of interest if processing resources of the first network entity are not sufficient for a processing task and if the reporting of the configurable event of interest received indicates an available processing capability of the event publishing network entity above a predefined processing capability threshold.

11. A method of supporting publish-subscribe features for events in a communication network, the method comprising:
sending an event subscription message from an event subscribing network entity to an event publishing network entity in a communication network, the communication network including a plurality of network entities, the plurality of network entities including the event subscribing network entity and the event publishing network entity, wherein the event subscription message includes information identifying the event subscribing network entity and configuration rules for configuring a configurable event of interest at the event publishing network entity, the configurable event of interest being adaptive to current information demands, wherein the configuration rules comprise one or more configurable parameters for defining or re-defining the configurable event of interest at the event publishing network entity and/or for defining or re-defining reporting of the configurable event of interest published to said event subscribing network entity, wherein the configurable event of interest is related to a processing load situation at the event publishing network entity, wherein the event publishing network entity is configured to report the configurable event of interest to the event subscribing network entity in an event notification message;
receiving the event notification message from the event publishing network entity at the event subscribing network entity;
distributing processing load among the plurality of network entities based on the reporting of the configurable event of interest by the event publishing network entity; and
transferring at least a part of a baseband processing task from a first network entity to the event publishing network entity after receiving the reporting of the configurable event of interest if processing resources of the first network entity are not sufficient for a processing task and if the reporting of the configurable event of interest received indicates an available processing capability of the event publishing network entity above a predefined processing capability threshold.

12. A non-transitory computer-readable medium storing program instructions that, when executed on a processor, cause a processor-controlled network entity to perform the method of claim 11.

13. The method according to claim 11, wherein the configurable event of interest is related to a published routing control plane, the method further comprising:
dynamically controlling network routing within the communication network based on the reporting of the configurable event of interest.

14. The method according to claim 11, wherein the configurable event of interest is indicative of an available processing capability of the event publishing network entity, the available processing capability deceeding or exceeding a predefined processing capability threshold.

15. The method according to claim 11, further comprising:
providing information on at least one second neighboring network entity neighboring a first network entity of the communication network, wherein the at least one second neighboring network entity fulfills a criterion used by the first network entity to define its neighborhood.

16. The method according to claim 11, wherein the one or more configurable parameters are from the group of an event threshold, an event hysteresis, an event granularity, a trigger for event notification, a time to trigger, an event notification frequency, and/or a notification content.

17. The method according to claim 13, further comprising:
receiving a request from a further network entity at the event subscribing network entity via the input interface and processing said request;
computing a network path based on the processing of the request, a network graph, and path computation constraints, said computed network path comprising a number of said plurality of network entities, said event subscribing network entity being linked with a traffic engineering database which is updated based on the reporting of the configurable event of interest and/or the computed network path; and
establishing a forwarding entry in a forwarding information base of a select network entity of the computed network path based on the processing of the request.

18. The method according to claim 11, wherein the communication network is a wireless communication network, wherein at least one network entity is coupled to at least one remote radio head of the wireless communication system, wherein the at least one network entity is configured to process radio bearer related baseband data of at least one associated user of the wireless communication system.

* * * * *